V. E. MERTZ.
APPARATUS FOR MOISTENING YARNS.
APPLICATION FILED FEB. 7, 1913.
1,103,806.
Patented July 14, 1914.
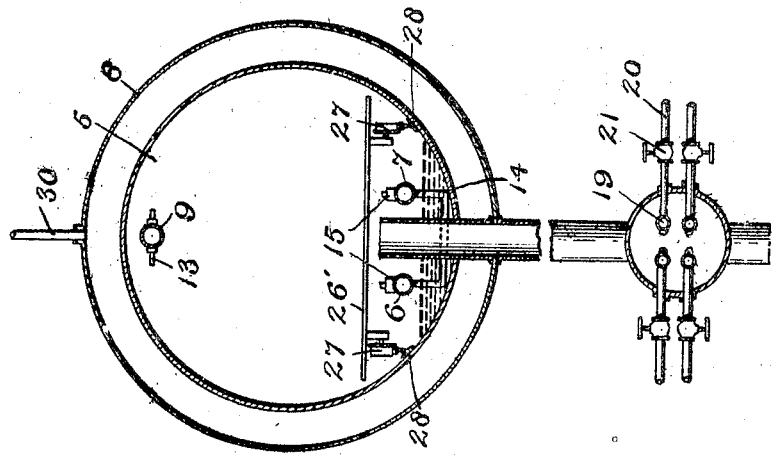
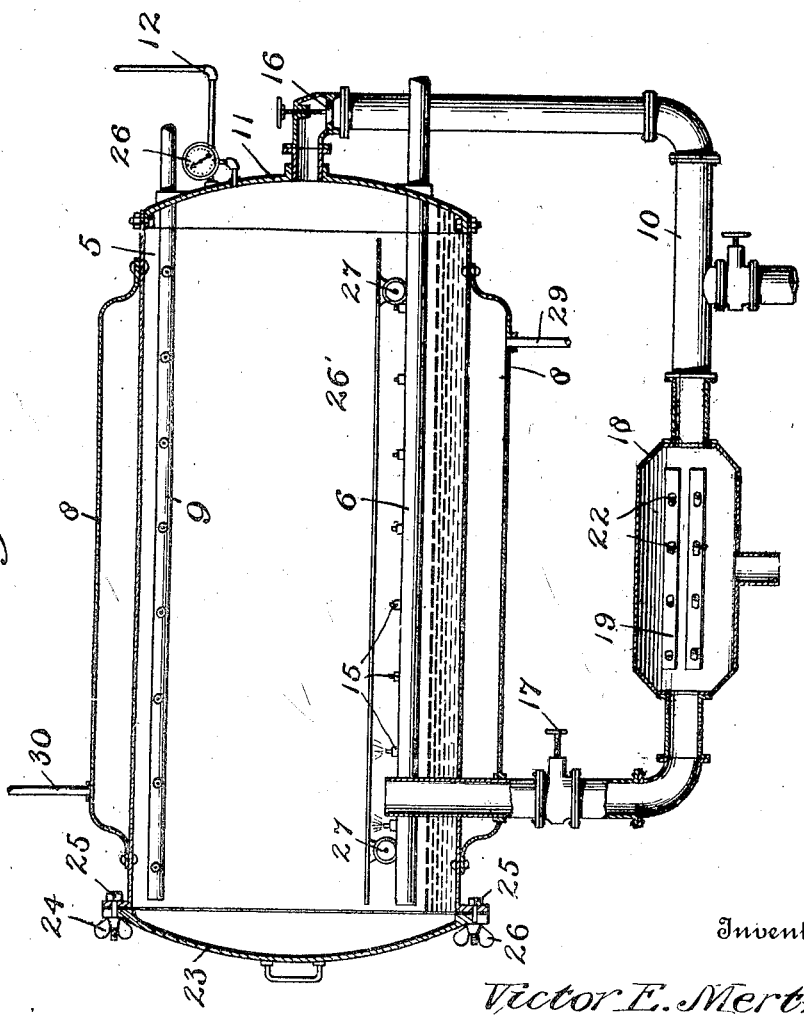
Inventor
Victor E. Mertz
By Victor J. Evans
Attorney
Witnesses
C. James Cronin
Geo. S. Byrne

UNITED STATES PATENT OFFICE.

VICTOR E. MERTZ, OF NEW YORK, N. Y.

APPARATUS FOR MOISTENING YARNS.

1,103,806.     Specification of Letters Patent.     Patented July 14, 1914.

Application filed February 7, 1913. Serial No. 746,903.

*To all whom it may concern:*

Be it known that I, VICTOR E. MERTZ, a citizen of Switzerland, residing at New York city, in the county of New York and State of New York, have invented new and useful Improvements in Apparatus for Moistening Yarns, of which the following is a specification.

The general object of the invention is to refine the apparatus for effecting the moistening of fibrous material as weaving or knitting-machine yarns, whereby, to obtain, first, a uniform impregnation of the material with moisture; second, the introduction of a maximum amount of moisture into the material; and third, the retaining by the material for a relatively long period, of approximately the whole amount of moisture applied thereto. And to these ends the invention resides in apparatus functioning to draw air from between the fibers and the cells of the fibers, then operating to introduce moisture into the places from which the air has been drawn.

Other objects will appear and be better understood from that embodiment of my invention of which the following is a specification, reference being had to the accompanying drawings forming part hereof, in which:—

Figure 1 is a vertical longitudinal section of the device. Fig. 2 is a vertical cross section.

One embodiment of apparatus used in connection with my method for moistening yarns is shown in the drawings and comprises a vacuum chamber, a moistening device in the form of water and steam supply pipes indicated respectively, by 6 and 7, independent operating cooling devices in the form of a water jacket 8 surrounding the chamber 5, and the other in the form of a spray pipe 9 directed into the chamber, and a circulating pipe 10. The chamber 5 has one end closed by an end wall 11 through which one end of an exhaust pipe 12 is directed and the other end of this pipe 12 is suitably connected to the receiver of a vacuum pump, not herein shown. The wall 11 is also tapped at its upper, lower and inter-portions for the cooling, moistening and circulating pipes 9 and 6, and 7 and 10 respectively, the first-named of these being connected to a suitable cold water supply (not shown) and having on the portion within the chamber 5, a double series of spraying nozzles 13 arranged so as to spray or direct the fluid in a horizontal direction onto the wall of the chamber to which it is held by capillarity until it descends into the body of liquid 14, in the bottom of the chamber. The second-named or moistening pipes 6 and 7 are located in the lower portion of the chamber and arranged in spaced relation to the bottom thereof. The pipe 6 is connected to a suitable source of steam supply and the pipe 7 is connected to a suitable source of liquid supply. Each of these pipes has a series of nozzles 15 adapted for atomizing or spraying the fluid as the same passes into the chamber. One end of the circulating pipe 10 is directed through the end wall 11 and its opposite end directed upwardly through the bottom of the chamber and at a point near the end remote from the wall 11. Passage through this pipe 10 is controlled by the valves 16 and 17, and arranged in the pipe and between the said valves is a chamber 18 in which are arranged a plurality of pipes 19 each of which has a pipe connection 20 to a suitable source of liquid supply (not shown) and in each pipe 20 is a valve 21 for controlling the passage of liquid from the point of supply to the pipe 19 to which it is connected. The pipes 19 are each provided with a series of nozzles 22 and the arrangement of these nozzles is such as to admit of the nozzles in the upper pair of pipes shown in Fig. 2, to direct the liquid entering the chamber in a direction opposite from that which the said liquid is directed upon entering the chamber by the nozzles in the lower pair of pipes.

Access to the interior of the chamber is had through the end remote from the end wall 11, a door or cover 23 being provided for closing this open end during the operation of moistening the yarn. Any improved means may be employed or adopted for fastening the door 23 to the chamber, as the winged nuts 24 which operate on the bolts 25.

The material, such as yarn to be moistened is arranged in a suitable receptacle and this receptacle is placed upon a truck or car 26 which with its load when the door 23 is opened, is directed into the chamber and guided so that the wheels of the truck 27 will take the track rails 28 suitably fastened to the inner surface of the chamber. Now with the car and its load arranged in the casing and the door 23 closed and secured so as to prevent the entrance of air into the chamber, the air pump connected to the pipe 12 is started and permitted to operate until the required percentage of vacuum is had in the chamber, a suitable gage 26 being employed to indicate various percentages of vacuum possible to be had in the chamber. It will be understood that during the operation of drawing the air from the chamber the valves 16 and 17 are closed and so also are the valves (not shown) which control the passage of fluid through the pipes 6 and 7, and the valves 21 which control the passage of fluid to the pipes 19. It may be well to state here that the action of the air pump draws the air not only from the chamber but also the air normally entrapped in the fibers of the yarns and in the cells of such fibers, hence it will be seen that when the gage 26 indicates the obtaining of the required percentage of vacuum in the chamber which percentage may be anywhere between twenty and seventy-five according to the desire of the user or the character of the particular kind of yarn in hand, the said yarn will be conditioned so as to receive between its fibers and into the cells of those fibers, an amount of moisture equal in volume, or substantially so to that of the air drawn from the yarn. This operation of drawing air from the yarn and casing forms the first step in my method hereinbefore mentioned, and the succeeding step resides in opening the valves of the pipes 6 and 7, to admit steam and water into the chamber. The character of the steam used is preferably low pressure, but super-heated steam may be employed if the character of the work in hand demands. The water passing through the pipe 7 may be above or below the normal (63 degrees Fahrenheit) but preference is given to the higher temperatures since the vaporizing of water at such temperatures by the steam is more readily effected. Now when these several details in point of temperature have been determined upon and the steam and water admitted into the chamber, the interior thereof becomes filled with an aqueous vapor or fog resulting from the mixing of the steam.

Since the best results in the operation of impregnating or hydrating of yarns is had with vapor of a constant and predetermined temperature, such temperature is maintained in the chamber by the water which circulates through the water jacket 8. In this instance the water enters the jacket through one of the pipes such as the pipe 29 and leaves the chamber through the opposite tube 30. In addition to the effect produced on the vapor in the chamber 5 by the water in the jacket 8 the cooling of the vapor in the chamber may be accelerated by admitting water into the pipe 9. In practice, however, water is admitted into the pipe 9 preferably only after the hydrating of the yarns and is at this time admitted solely for the purpose of reducing the temperature of the vapor in the chamber to substantially that of the outside atmosphere so that upon the opening of the door 23 in the operation of removing the yarn from the chamber, the moisture in such yarn will, on account of its having a temperature substantially the same as the outside atmosphere, be unaffected or vaporized by virtue of the outside temperature into which it is taken from the chamber. It might here be stated that the vapor resulting in the chamber from the introduction thereinto of the steam and water through the pipes 6 and 7, is used for moistening in the cells and inner fibers of the yarns, and upon the closing of the fluid supplies to the pipes 6 and 7, the moisture in the casing is relatively dry and not efficient for moistening the surfaces of the yarns. Therefore, the third step in my method consists in super-saturating this vapor remaining in the chamber and this super-saturation is effected by opening the valves 16—17 and the horizontally alining valves 21. Now if the upper of these last-named valves as shown in Fig. 2, be opened then the water passing from the nozzles 22 will move to the left in Fig. 1 and upwardly through the left hand end portion of the pipe in the said figure. This will have the effect of drawing the vapor from the casing through the upright right hand end of the said pipe which vapor upon passing into the chamber 18, will commingle with the spray from the nozzles 22 so that when it reënters the casing at the point on the left in the said figure, it will contain a greater percentage of water than at first. Thus, it will be seen that the action of the spray from the nozzles 22 will set up a circulation of the vapor in the chamber in addition to additionally saturating the same. Now it will be manifest that after the vapor has been circulated as just described, or in a clockwise direction, the temperature of the moisture which has remained undisturbed for a relatively long time in the chamber, will be considerably higher than that which previously entered the chamber and since this vapor of higher temperature will actually be at the upper part of the chamber it may found desirable to change the direction of circulation of the vapor through the pipe 10 in order to expeditiously increase the amount of water in aforesaid vapor of higher temperature, and this is done by closing the valves which control the circulation of the water in a clockwise direction and opening the lower valves in Fig. 2 which will admit the water to the lower nozzles and thus cause a circulation through the pipe 10 and chamber in a contra-clockwise direction.

In instances where a relatively high percentage of vacuum is unnecessary for conditioning the material in the chamber to receive the moistening agent, the impregnation of the said material may be effected in the following manner: The temperature of the interior of the chamber is raised considerably above that on the outside. This may be done by admitting steam into the chamber from one of the steam supply pipes directed thereinto. Now this raising of the interior temperature will have the effect of rarefying the air within the chamber, consequently the atmospheric pressure within the chamber will be less than the outside pressure. It will be understood, of course, that during this operation the door 23 is open. Now with the interior of the chamber conditioned as just described the material to be impregnated is introduced into the chamber as previously described, and the door closed and sealed airtight. The next step consists in contracting the volume of air within the chamber and this is accomplished by circulating relatively cold water through the water jacket 8. Now with a volume the air within the chamber thus contracted, obviously, the cells of yarn or other material contained in the chamber, will open by virtue of the reduction of pressure resulting from the contraction of the air volume, so that when vapor is created in the chamber in the manner previously described, the said vapor will readily find its way into the cells of the material contained in the chamber. It is obvious that by contracting the circulation of water through the jacket 8 various percentages of vacuum may be had in the chamber, for instance when the water is permitted to circulate only very slow through the jacket, the percentage of vacuum in the chamber will be lower than in instances where the circulation is rapid.

What is claimed as new is:

1. Apparatus for moistening fibrous material, comprising a vacuum chamber having a door at one end thereof, a fluid conveying pipe directed into the said chamber and adapted to discharge therein, and means for circulating a cooling agent around the surface of the chamber for the purpose described.

2. Apparatus for moistening fibrous material, comprising a vacuum chamber having a door at one end thereof, a steam pipe directed into the said chamber and adapted to discharge therein, and means for circulating a cooling agent around the surface of the chamber for the purpose described.

3. Apparatus for moistening fibrous material, comprising a vacuum chamber, a plurality of steam and water pipes directed into the said chamber and adapted to discharge therein, a circulating pipe having its opposite ends directed into the chamber and having one of its ends arranged higher in the chamber than the other end, a series of nozzles connected to fluid supply pipes and located in the circulating pipe and adapted for directing liquid to move in one direction through the said circulating pipe, and a second series of nozzles connected with fluid supply pipes and arranged in the circulating pipe and adapted for directing liquid to move through the supply pipe in a direction opposite from that had with the first series, and a water jacket connected with the vacuum chamber.

In testimony whereof I affix my signature in presence of two witnesses.

VICTOR E. MERTZ.

Witnesses:
M. E. LAUGHLIN,
GEO. A. BYRNE.